July 26, 1949.  W. W. CEASE  2,477,239
DISPENSING APPARATUS
Filed Sept. 17, 1945  5 Sheets-Sheet 1
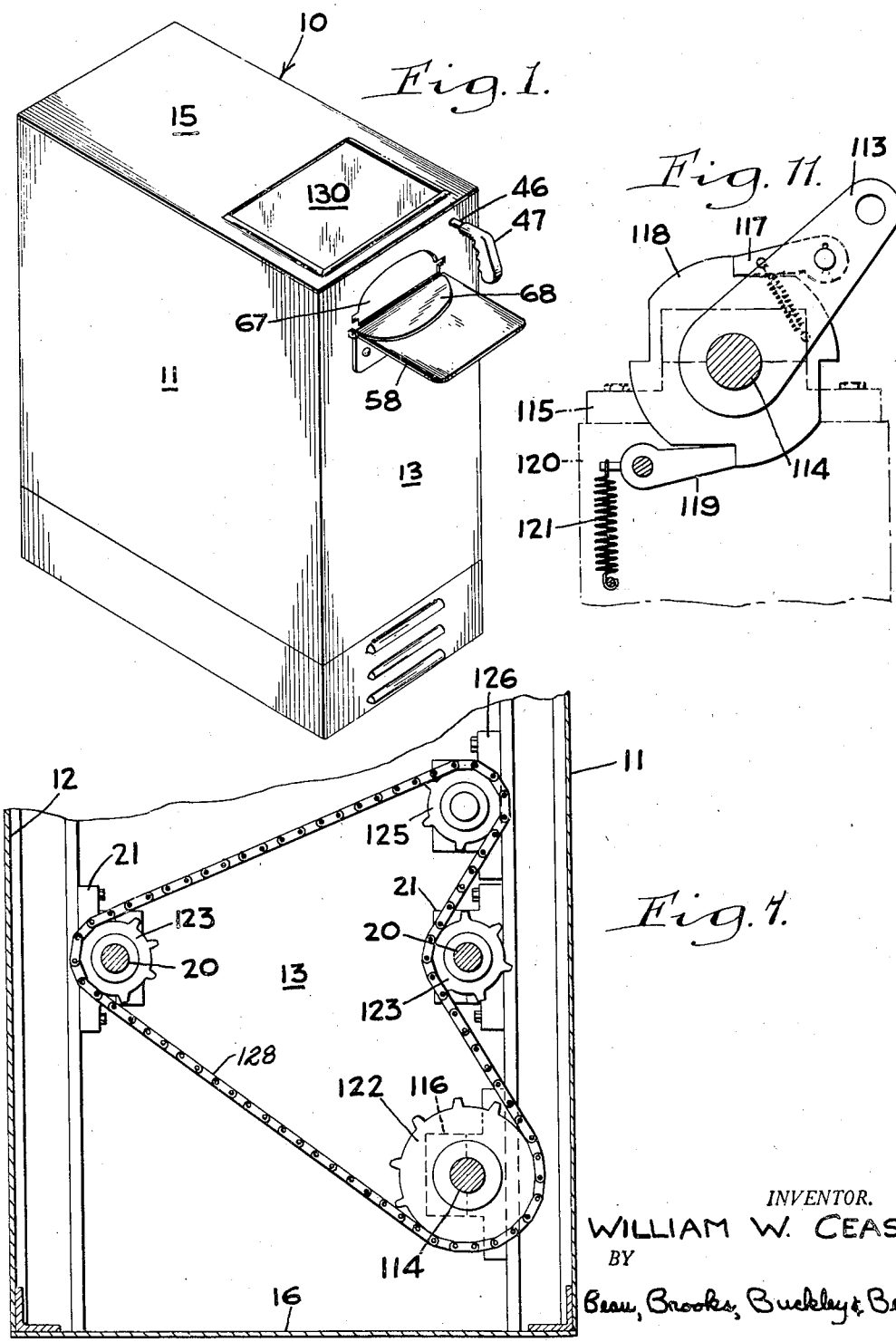
INVENTOR.
WILLIAM W. CEASE
BY
Beau, Brooks, Buckley & Beau.

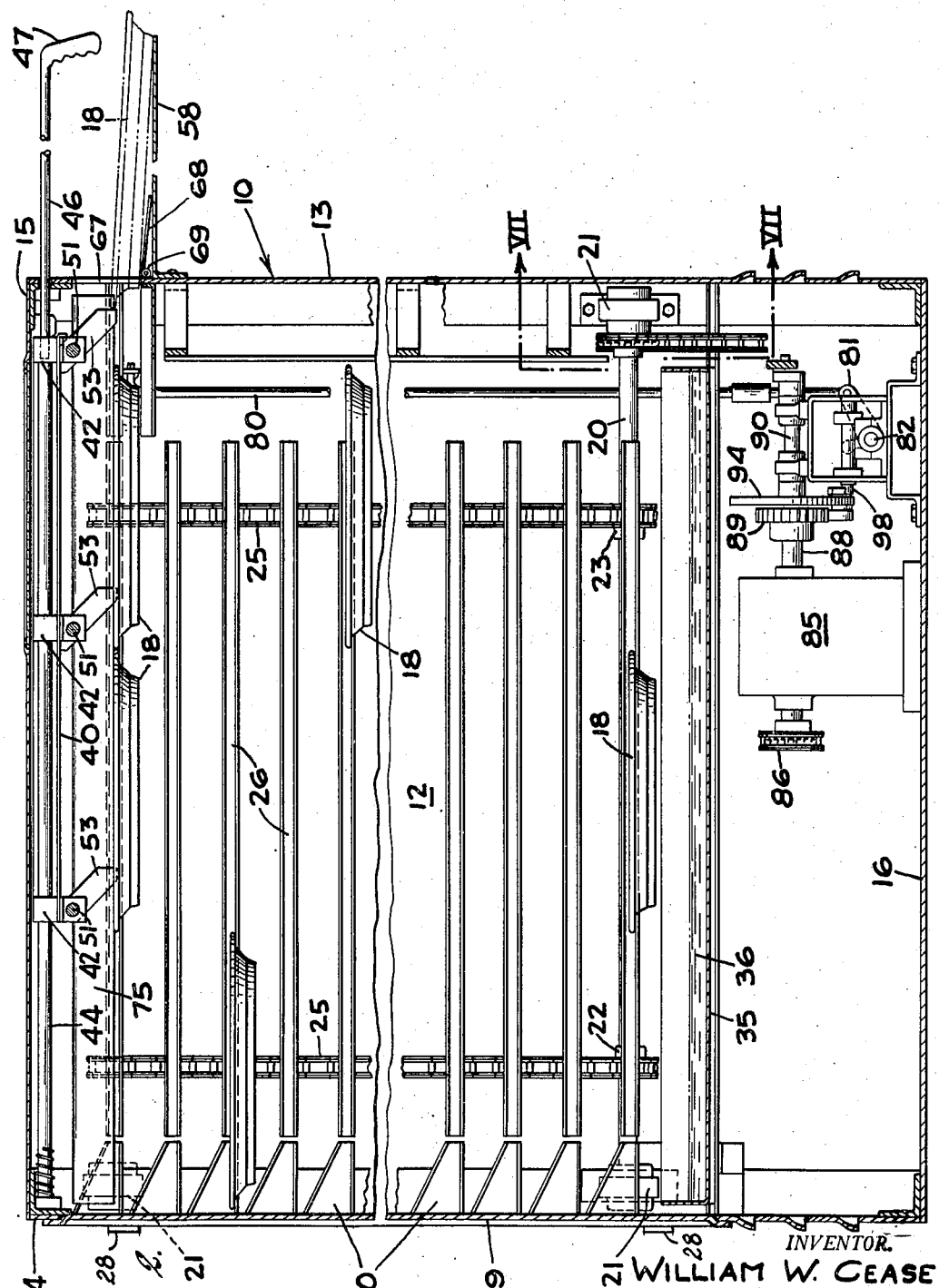

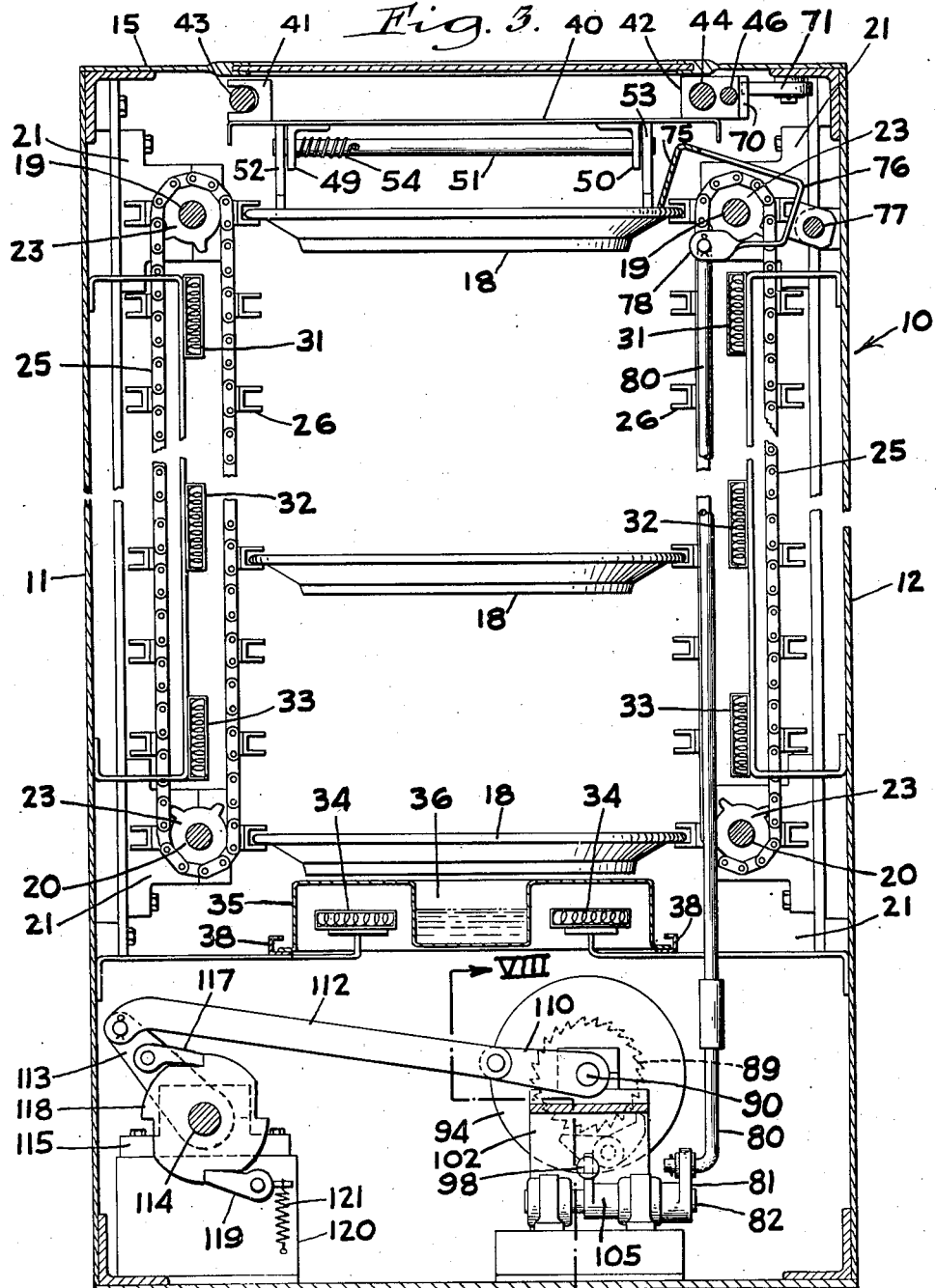

July 26, 1949.    W. W. CEASE    2,477,239
DISPENSING APPARATUS
Filed Sept. 17, 1945    5 Sheets-Sheet 4
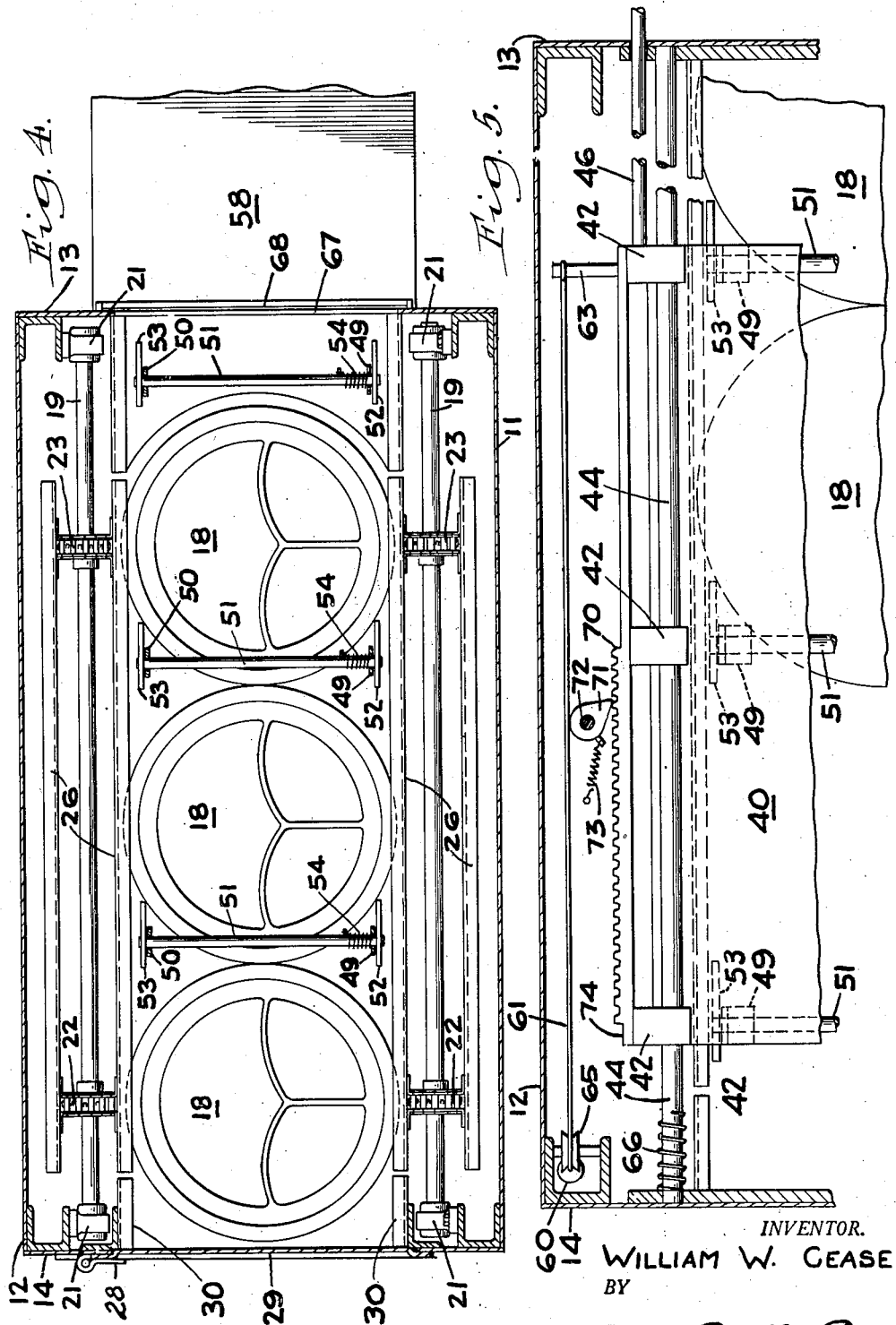
INVENTOR.
WILLIAM W. CEASE
BY
Bean, Brooks, Buckley & Bean July 26, 1949.  W. W. CEASE  2,477,239
DISPENSING APPARATUS
Filed Sept. 17, 1945  5 Sheets-Sheet 5
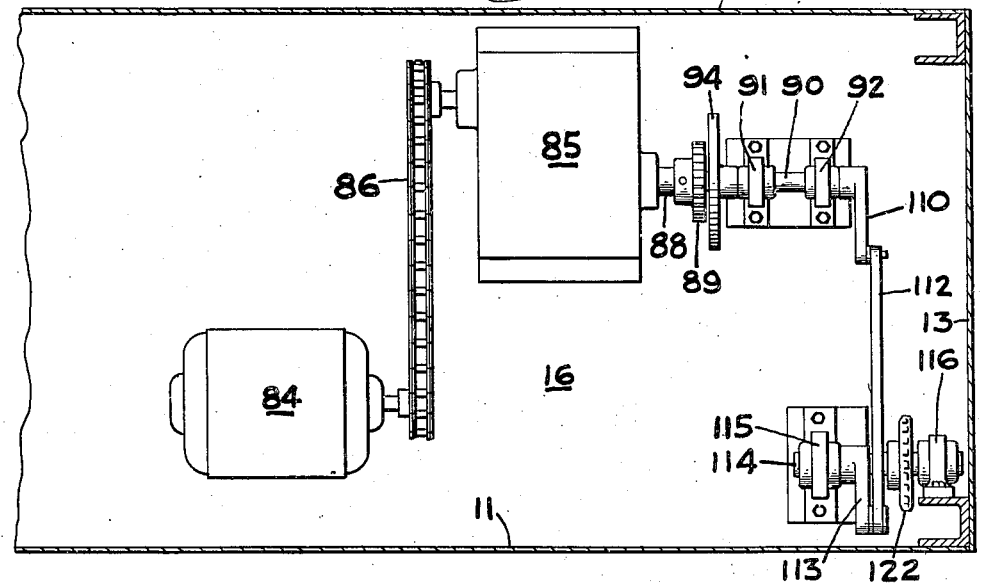
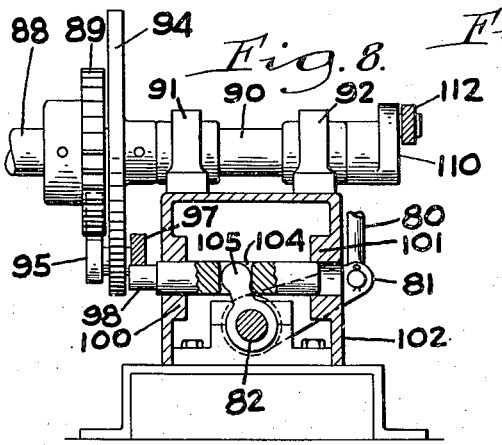
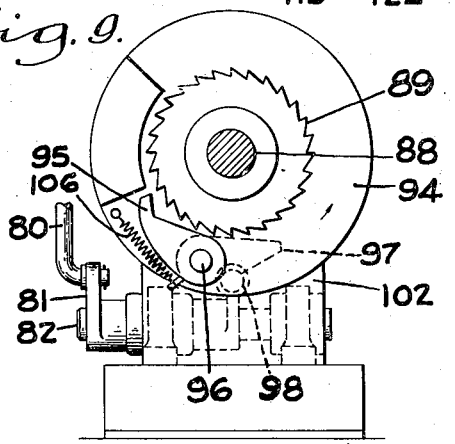
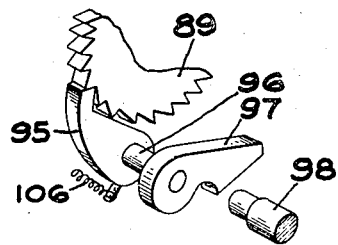
INVENTOR.
WILLIAM W. CEASE
BY
Beau, Brooks, Buckley & Bean Patented July 26, 1949

2,477,239

UNITED STATES PATENT OFFICE 2,477,239

DISPENSING APPARATUS

William W. Cease, Fredonia, N. Y.

Application September 17, 1945, Serial No. 616,696

4 Claims. (Cl. 312—69)

1

This invention relates to food dispensing apparatus and particularly to means for successively dispensing individual servings of food.

According to the present invention apparatus is provided whereby a considerable number of servings of food may be compactly arranged in a cabinet or similar enclosure where they may be raised to and maintained at the proper temperature for serving, together with means for conveniently and simply dispensing the servings at a single dispensing point in a successive manner.

The apparatus of the present invention is susceptible of use in a variety of ways, all of which fall within the scope of the present invention. The apparatus may be filled with a number of servings of frozen food which are then thawed and brought to proper temperature for serving within the apparatus, following which individual servings may be selectively dispensed by a succession of duplicate dispensing operations, quickly and conveniently. In the alternative, the servings of food introduced to the cabinet may be at room temperature, already partly warmed, or fully warmed. In any event the heating means of the present apparatus, which may assume a variety of forms but is preferably electrical, is arranged to achieve and maintain desired temperatures within the apparatus under the control of automatic thermostatic means. Conversely, the cabinet may be provided with suitable refrigerating apparatus for maintaining the temperature of refrigerated food contained therein or for freezing foods directly therein. The heating may be accomplished indirectly by forced circulation of hot air by means of a blower and the same indirect means may be used for refrigerating if desired.

The present apparatus will hold food at proper temperature and in proper condition for several hours whereupon a single attendant may serve several hundred meals in an extremely brief period of time. This permits more careful and accurate preparation of meals as to size of portions than if the meals are dished up from steamtables or other receptacles at the time they are to be served. The portability of the apparatus renders its use ideal in serving meals in hospitals and similar institutions. Serving pre-plated food with the present apparatus is far more sanitary than present steamtable and other conventional practices.

Various modifications may be made in the construction illustrated in the accompanying drawings and described in detail hereinafter. The apparatus set forth is by way of example only and the present invention is not limited in any way excepting as defined in the appended claims.

In the drawings:

Fig. 1 is a perspective view of the form of dispensing cabinet shown by way of example;

Fig. 2 is a longitudinal cross-sectional view, in a vertical plane, of the cabinet of Fig. 1;

Fig. 3 is a transverse cross-sectional view, in a vertical plane, viewed from the serving end of the cabinet;

Fig. 4 is a top plan view of the cabinet with the top wall thereof and other parts of the mechanism broken away for clarity of illustration;

Fig. 5 is a fragmentary view similar to Fig. 4 but with the ejecting mechanism, which is partly omitted from Fig. 4, shown in detail;

Fig. 6 is a top plan view of the motor drive mechanism in the base of the cabinet with upper portions of the cabinet broken away;

Fig. 7 is a fragmentary cross-sectional view on the line VII—VII of Fig. 2;

Fig. 8 is a fragmentary cross-sectional view taken on the line VIII—VIII of Fig. 3;

Fig. 9 is a fragmentary elevational view of the mechanism of Fig. 8 viewed from the left as seen in Fig. 8;

Fig. 10 is a fragmentary perspective view of the ratchet pawl mechanism of Figs. 8 and 9; and Fig. 11 is a fragmentary elevational view of the mechanism appearing in the lower left-hand corner of Fig. 3 but on a somewhat enlarged scale and viewed from the opposite side.

Throughout the several figures of the drawings like characters of reference denote like parts and the numeral 10 designates generally in Fig. 1 a casing having side walls 11 and 12, front and rear walls 13 and 14 respectively, a top wall 15, and a bottom wall 16. The several walls may be assembled by attachment to common corner angle irons as indicated variously in the drawings and attachment may be in any convenient manner as by welding, screws, bolts or otherwise.

Within the cabinet 10 means are provided for movably supporting a number of food receptacles, in the illustrated instance, dinner plates or platters 18, in a compact and secure manner. While the drawings illustrate circular dinner plates by way of example, the use of rectangular platters or trays permits fuller utilization of the available space and is fully contemplated. The movable supporting means for the plates, platters or trays include, referring particularly to Figs. 2 and 4, an upper sprocket shaft 19 and a lower sprocket shaft 20 located at each side of the cabinet. All four sprocket shafts extend lengthwise and are supported for rotation by bearings 21 which are secured against the framework of the cabinet as best shown in Fig. 4. Each of the sprocket shafts 19 and 20 has fixed thereto a pair of axially spaced sprockets 22 and 23. The aligned sprockets of the upper and lower shafts 19 and 20 are connected by vertically extending endless chains 25 and the two chains at each side of the cabinet are connected by a series of parallel equally spaced channels 26 which extend lengthwise within the cabinet and have their flanged portions directed away from the chains whereby each pair of registering channels 26, one at each side of the cabinet, forms a support for a series of plates or receptacles 18. In a cabinet constructed in accordance with the proportions illustrated three dinner plates arranged lengthwise of the cabinet may be symmetrically supported by each pair of inwardly facing channels 26 and a row of plates or platters thus arranged may be raised in the cabinet by simultaneous rotation of the sprocket shafts 19 and 20.

Access to the channels for loading the cabinet is gained by means of a door 29 hinged to the rear wall 14 of the cabinet as at 28. In loading the cabinet all of the pairs of channels which are directed toward the center of the cabinet, see Fig. 3, are loaded with three plates each. In the case of oblong platters or trays as many as five may comprise each row in a cabinet of the proportions illustrated herein. To facilitate introduction of the edges of the plates or platters to the channels 26 tapering channel members 30 are secured to the cabinet frame work in line with each pair of inwardly facing channels 26 as appears best in Fig. 2.

In use the door 29 is closed and the contents of the plates are thawed and heated or merely heated to the desired degree for use by means of conventional bar heating elements 31, 32, and 33 at each side of the cabinet and extending lengthwise thereof within the loop formed by the chains 25. Further lengthwise bar heating elements 34 are arranged beneath an inverted pan 35 which has a central upwardly opening depression 36 which may be filled with water to maintain a proper degree of humidity within the cabinet. The pan 35 is removably supported by a pair of opposed channels 38 which extend rigidly between the front and rear of the cabinet, and the pan 35 may thus be removed readily for cleaning or for access to the heating elements 34. It is to be understood that the resistance heating elements shown are merely by way of example and other electrical heating means may be employed.

Reference will now be had to the means provided for removing individual plates or platters from the apparatus. Such removal is effected by sliding the front plate from the uppermost tier of plates illustrated in Fig. 2. The plate 18 shown in dot and dash lines in Fig. 2 has just been moved to a position where it may be picked up and removed entirely from the apparatus by a customer or an attendant. In describing the plate removing means, reference will be had particularly to Figs. 2 and 5 and to the upper portion of Fig. 3.

Reference is had herein to manual means for initiating and completing each dispensing operation. However, it is to be understood that the motor means herein provided may supply the energy for accomplishing individual dispensing, each dispensing operation being merely selectively initiated by push button control or otherwise. Also, the dispensing apparatus may be readily provided with suitable coin controlled dispensing mechanism, within the concept of the present invention.

A panel 40 extends horizontally in the upper portion of cabinet 10 and is provided at its opposite sides with a series of bearing blocks 41 and 42 which have axial sliding bearing on bars 43 and 44 respectively. The bars 43 and 44 extend lengthwise and may be rigidly secured in opposite ends of the casing 10 in any convenient manner. The forward bearing block 42 has secured thereto a rod 46 which extends forwardly through the front wall 13 of the cabinet and terminates in a manipulating handle 47.

The under side of panel 40 is provided with three pairs of opposed bearing brackets 49 and 50 and each pair of bearing brackets supports a rock shaft 51 whose opposite ends are provided with fingers 52 and 53. The fingers 52 and 53 are fixed to rock shaft 51 and a torsion spring 54 acts between each rock shaft 51 and its associated left-hand bearing bracket 49 to urge the fingers 53 to the position illustrated in Fig. 2, their clockwise movement as viewed in Fig. 2 being limited by engagement of their upper ends against the under side of panel 40.

When the handle 47 is pulled forwardly as illustrated in Fig. 2, each pair of fingers 52, 53 engage one of the three plates of the tier illustrated in Fig. 4 and move them forward equal distances with the result that the forwardmost plate is ejected upon a shelf 58 secured to the front of the cabinet 10. The second and third plates of the tier are moved simultaneously to the first and second positions, respectively. When the handle has been pulled completely forwardly and is released, the panel 40 and the devices supported therewith automatically move rearwardly by reason of a weight 60 which depends from one end of a cable 61 whose other end is fastened to a pin 63 supported by the forward bearing block 42.

A pulley 65 is mounted for free rotation in a vertical plane at a rear corner of the cabinet 10 as illustrated clearly in Fig. 5, and the cable 61 extends rearwardly from its anchoring pin 63 on bearing block 42, over the pulley and downwardly to connect with the weight 60. The rearward pull on the panel 40 and its connected parts is thus constant in value throughout its rearward movement and is not variable as in spring biased mechanisms. The rear ends of bars 43 and 44 are provided with compression coil springs 66 which serve merely as a cushion bumper which is engaged by the rear bearing blocks 41 and 42 as the assembly reaches its rearward limit of movement.

As is best shown in Fig. 1, front wall 13 has an opening 67 directly above shelf 58 and in line with the upper tier of plates or platters, to permit the latter to move outwardly to shelf 58 during dispensing operation. A door 68 normally closes opening 67 and for this purpose has a spring hinge 69 along its lower edge. The bias of the spring hinge 69 is relatively light so that pressure of a plate or platter against door 68 from the inside causes the door to swing to the open position illustrated in Figs. 1 and 2. Removal of the plate 18 shown in dot and dash lines in Fig. 2 from shelf 58 permits the door 68 to automatically close.

It is desired that, once a user begins a dispensing operation by pulling upon the handle 47, the dispensing cycle must be completed by a full withdrawal of the pull rod 46 before a subsequent cycle can be initiated. To this end a rack bar 70 is secured to the outside of the bearing blocks 42 as best shown in Fig. 5. A pawl 71 is rotatably mounted upon a pivot pin 72 which is secured to the upper wall 15 of the cabinet and pawl 71 is urged in a clockwise direction as viewed in plan by an extension spring 73. It will be seen that the pawl 71 prevents retrograde movement of the rack bar 70 and consequently of the panel 40 when the parts are in the intermediate position shown in Fig. 5.

However, when the withdrawing movement is rendered complete by full withdrawal of handle 47 a notch 74 which is much wider than the individual spaces between the teeth of rack 70 arrives at pawl 71 and the latter then is rotated in a clockwise direction by spring 73 to such position that the rack 70 may move rearwardly with its teeth riding against the trailing side of pawl 71. A subsequent withdrawing operation causes the first forward tooth of rack 70 to engage against the pawl 71 and again swing it to its detaining position as illustrated in Fig. 5.

Successive dispensing operation may thus be repeated until all of the plates or platters of the row which is at the level of the dispensing opening have been removed. It is desired that successive dispensing operations be effective to dispense the entire contents of the cabinet and means are provided which operate automatically when all of the plates or platters of a particular row or tier are dispensed to raise the next row or tier of platters to the dispensing level. Such means will now be described.

Referring to Figs. 2 and 3, the numeral 75 designates a longitudinal rail which rests upon the plates or platters 18 of the upper row or tier and the rail 75 is supported by brackets 76 mounted for free rotation on pivot pins 77. One of the brackets 76 includes an extension 78 which pivotally engages the upper end of a vertically extending push rod 80. The lower end of push rod 80 pivotally engages the outer end of a clutch operating arm 81 which is fixed to a rock shaft 82.

The drive means for rotating sprocket shafts 19 and 20 and sprockets 23 to elevate a row of plates or platters will not be described and reference is had first to Fig. 6 which shows in plan a driving motor 84 and a conventional speed reducing gear 85 connected thereto by a chain and sprocket drive 86. The driving motor 84 is energized whenever the device is available for use and may be controlled by an external manual switch (not shown) if desired. The speed reducing gear 85 has an output shaft 88 which has fixed thereto a ratchet wheel 89. A shaft which is arranged to be intermittently driven by output shaft 88 is designated 90 and is supported in coaxial end-to-end relation with respect to output shaft 88 by means of bearings 91 and 92.

The shaft 90 has a disc 94 fixed thereto adjacent to ratchet 89 and a ratchet pawl 95 is fixed to a pawl rock shaft 96 which is rotatably carried by disc 94. At the opposite side of disc 94 the pawl rock shaft 96 has a release finger 97 fixed thereto and the release finger 97 is normally held in the position illustrated in Fig. 9 by a clutch pin 98 which is supported for axial movement in bearings 100 and 101 provided in a housing element 102 which incidentally supports bearings 91 and 92 of shaft 90.

Clutch pin 98 has a transverse opening 104 formed therein and a release arm 105 fixed to rock shaft 82 has its outer end engaged in the opening 104 as shown in Fig. 8. A tension spring 106 acts between pawl 95 and disc 94 to urge the pawl and its rock shaft 96 in a clockwise direction as viewed in Fig. 9. It will be seen from the foregoing that lowering movement of push rod 80, resulting from emptying of a row of receptacles at the dispensing level and consequent lowering of rail 75, will withdraw clutch pin 98 through operation of release arm 105 and spring 106 will move pawl 95 into engagement with ratchet 89 which is fixed to the output shaft 88 of the reducing gear 85.

This causes the shafts 88 and 90 to rotate jointly and shaft 90 has fixed thereto a crank arm 110 which is pivoted to one end of a link 112 whose other end pivotally engages an arm 113 rotatably mounted on a shaft 114 supported in bearings 115 and 116, see Fig. 6. Arm 113 carries a driving pawl 117 which engages a ratchet wheel 118 fixed to shaft 114. A locking pawl 119, to prevent retrograde movement of ratchet wheel 118, is pivoted to the side of a block 120 which supports bearing 115 and an extension spring 121 engages between pawl 119 and block 120 to urge the locking pawl into engagement with ratchet wheel 118.

When crank arm 110 makes one complete revolution with shaft 90 arm 113 is rocked through an arc of such length as to move pawl 117 and consequently ratchet wheel 118 through one-fourth of a revolution, advancing the ratchet wheel one tooth. Shaft 114 also has fixed thereto a sprocket 122, see Figs. 6 and 7. Referring further to Fig. 7, the lower sprocket shafts 20 extend forwardly, as may be seen in Fig. 2, and are provided with driving sprockets 123. An idler sprocket is designated 125 in Fig. 7 and is supported by a bearing 126 secured against the interior frame work of the cabinet in any desired manner.

A chain 128 extends about the several sprockets 122, 123 and 125 in the manner shown in Fig. 7 whereby the shafts 20 are driven synchronously in opposite directions whereby to raise the inside facing channels 26 of chains 25 when drive sprocket 122 is rotated. The proportions are such that one rotation of crank arm 110, translated into movement of one ratchet tooth of ratchet 118, raises the channels 26 one tier to present the next row of plates or platters at the dispensing level.

If as much as one plate or platter is present in the tier below the dispensing level when operation of the elevating mechanism is commenced by the withdrawal of clutch pin 98 due to the lowering of rail 75 and push rod 80, then such plate or platter will raise the rail 75 and push rod 80 as the plate approaches the dispensing level and such movement projects the clutch pin 98 so that it cams the finger 97 into the position illustrated in Fig. 9, breaking the driving engagement between pawl 95 and ratchet wheel 89. If one or more pairs of channels beneath the dispensing level are devoid of plates or platters, as in Fig. 3 for instance, the push rod 80 will remain lowered, the clutch pin 98 will remain withdrawn, and driving operation of the sprockets 23 will be successively and automatically repeated by continued oscillation of the arm 113 which operates ratchet wheel 118 until a pair of channels 26 containing one or more plates or platters reaches the dispensing level and raises rail 75 as aforesaid.

It will be noted that a window 130 is illustrated in the forward portion of the top wall 15 of the cabinet, whereby a prospective patron may view the contents of the receptacle which is the next to be dispensed.

In the preferred form illustrated herein the operation is such that all receptacles move upwardly to the dispensing level. It will be understood that the principles of the present invention apply with equal facility to an arrangement wherein movement of the receptacles is progressively downward to a lower dispensing level.

What is claimed is:

1. Food dispensing apparatus comprising an enclosure, means for supporting a plurality of horizontal rows of food receptacles in said enclosure one above the other, a dispensing opening disposed at a given level, means for successively moving the individual receptacles of a given row through said opening, power means for moving a vertically adjacent row of receptacles to the dispensing level, and control means engageable with receptacles at the dispensing level and movable when the last receptacle of a row is dispensed to actuate said power means until the control means is reengaged by receptacles at the dispensing level.

2. Food dispensing apparatus comprising an enclosure, elevator means for supporting a plurality of horizontal rows of food receptacles in said enclosure one above the other, a dispensing opening disposed at an upper level in said enclosure and means for successively moving the individual receptacles of a given row through said opening, power means for moving the elevator means to raise the several rows of receptacles and present another row of receptacles at the dispensing level, and control means engageable with receptacles at the dispensing level and movable when the last receptacle of a row is dispensed to actuate said power means until the control means is reengaged by receptacles at the dispensing level.

3. Food dispensing apparatus comprising an enclosure, means for supporting a plurality of horizontal rows of food receptacles in said enclosure one above the other, a dispensing opening disposed level with the upper row of receptacles, means for successively moving the individual receptacles of a given row through said opening, power means for moving the next subjacent row of receptacles to the dispensing level, and control means engageable with receptacles at the dispensing level and movable when the last receptacle of the row at the dispensing level is dispensed to activate the power means until the control means is reengaged by receptacles at the dispensing level.

4. Food dispensing apparatus comprising an enclosure, means for supporting a plurality of horizontal rows of food receptacles in said enclosure one above the other, a dispensing opening disposed at a given level and means for successively moving the individual receptacles of a given row through said opening, said means comprising members engaging said row of receptacles and movable to advance the entire row toward the dispensing opening whereby the forward receptacle is dispensed and the others are advanced toward the opening, power means for moving a vertically adjacent row of receptacles to the dispensing level, and control means engageable with receptacles at the dispensing level and movable when the last receptacle of said row is dispensed to activate said power means until the control means is reengaged by receptacles at the dispensing level.

WILLIAM W. CEASE.

REFERENCES CITED

The following references are of record in the file of this patent:

UNITED STATES PATENTS

| Number | Name | Date |
|---|---|---|
| 986,664 | Wetherly | Mar. 14, 1911 |
| 1,512,122 | Marcel | Oct. 21, 1924 |
| 1,564,540 | Dinwiddie | Dec. 8, 1925 |
| 2,294,050 | Rottman | Aug. 25, 1942 |
| 2,314,632 | Rear | Mar. 23, 1943 |